United States Patent [19]

Strauch et al.

[11] 4,151,525
[45] Apr. 24, 1979

[54] RADIO-ELECTRIC SYSTEM FOR LOCATING A GIVEN OBJECT

[75] Inventors: Raymond Strauch, Viroflay; Jean-Pierre Tomasi, Velizy, both of France

[73] Assignee: Telecommunications Radioelectriques et Telephoniques T.R.T., Paris, France

[21] Appl. No.: 810,668

[22] Filed: Jun. 28, 1977

[30] Foreign Application Priority Data

Jul. 1, 1976 [FR] France .................... 76 20091

[51] Int. Cl.² .................... G01S 9/52; G01S 9/58
[52] U.S. Cl. .................... 343/6.5 R; 343/7.5; 343/16 LS
[58] Field of Search ............ 343/16 LS, 7.5, 6.5 LC, 343/6.5 R (U.S. only), 6.5 R

[56] References Cited

U.S. PATENT DOCUMENTS

| 3,246,322 | 4/1966 | Kuecken | 343/7.5 X |
| 3,341,845 | 9/1967 | Deman | 343/6.5 LC |
| 3,739,378 | 6/1973 | Botzum et al. | 343/6.5 R |
| 3,825,929 | 7/1974 | Toman | 343/6.5 R |
| 3,987,446 | 10/1976 | Lipsky | 343/16 LS X |
| 3,992,709 | 11/1976 | Watanabe et al. | 343/7.5 |
| 4,001,825 | 1/1977 | Antonius | 343/7.5 |

FOREIGN PATENT DOCUMENTS

1557670  2/1969  France .................... 343/7.5

Primary Examiner—Malcolm F. Hubler
Attorney, Agent, or Firm—Algy Tamoshunas

[57] ABSTRACT

The disclosed system is intended to supply angular and range data regarding the position of an object to be located in a reference system. The system comprises an interrogator which transmits a linearly frequency-modulated signal to a transponder disposed on the object. The transponder is provided with means for shifting the frequency of the received signal in one direction by a predetermined amount characteristic of that transponder and means for retransmitting the received signal. The interrogator further includes a pair of receiving antennas whose signals are used for forming beat signals with the transmitted signal. The interrogator is also provided with means for shifting the frequency of the beat signals in the other direction by the same amount. At least one of the shifted beat signals is applied to a frequency discriminator whose output signal is utilized for controlling the slope of the modulation signal in order to keep the frequency of the shifted beat signal constant.

13 Claims, 11 Drawing Figures

RADIO-ELECTRIC SYSTEM FOR LOCATING A GIVEN OBJECT

The invention relates to a radio system for locating a given object in a reference system, the system comprising an interrogator having a transmitter controlled by a modulator for supplying a linearly frequency-modulated signal to a transmitting antenna which radiates towards the object, receiving antennas for receiving a wave from the object which corresponds to the transmitted wave, and means for forming beat signals between the transmitter signal and the signals from the receiving antennas. In such a system the range and the angles which determine the position of the object in the reference system are derived from the beat signals.

Such a location system may be used in aeronautics, for example, to locate an aircraft in a reference system which is fixed with respect to the ground. Another application is in locating by each aircraft in flight formation of several aircraft, a particlar aircraft which precedes it. Finally, the system may be used in an aircraft to determine its position relative to a ground-based reference point.

A location system of the type mentioned above is known per se and described, for example, in an article by Davies and Rao Studies of a "Twin-Channel Frequency-modulated Echo-location System", published in the periodical Radio and Electronic Engineers, 28, Sept. 1964, pages 161–172. In the described system, the target to be located receives a linearly frequency-modulated wave from a transmitter and reflects directly an echo towards the two receiving antennas which are relatively near each other in comparison to their distance to the target. The two beat signals between the signals from the receiving antennas and the transmitter signal each constitute a measure of the distance between the two receiving antennas and the target whereas, the product of the two beat signals is representative of an angular bearing of the target. The above-mentioned article describes the difficulties which are encountered in locating the bearing of a given target among other targets. Such a solution is apparently difficult to apply, for reasons of security, to the above-mentioned problems, notably the solution as regards the flight in formation of various aircrafts, for an interrogation system disposed on an aircraft might receive echos from all the other aircrafts and also from the ground and it would be very difficult to determine the position of a given aircraft with prior art techniques.

It is an object of the present invention to provide a sure and exact location system which avoids the above-mentioned difficulties.

In accordance with the invention the target or targets to be located are provided with a tansponder retransmits which the received linearly frequency-modulated wave while assigning to the retransmitted signal one or various characteristics which are specific to each target and discernable by the interrogator. The beat signals formed in the interrogator are processed in a control loop which causes the slope of the modulation signal of the transmitter to vary from the slope of the controlled modulation in accordance with a technique of the type utilized in radioaltimeters and range meters. The first measure permits the selection of a specific target by the interrogator when the control loop is not yet stabilized. When this loop is stabilized with the selected target it acts as a filter which eliminates the echo signals coming from other targets located outside a narrow path surrounding the selected target.

The location system of the invention thus includes a transponder mounted in the object to be located. The transponder is provided with means for receiving the transmitted signal of, means for forming from the received signal a signal comprising a component having the same modulation slope and shifted in frequency in a given direction and a given shift frequency which characterizes the transponder and, finally, with means for retransmitting the signal comprising said frequency-shifted component. The interrogator is provided with means for detecting the beat signals from the component which corresponds to the component formed in the transponder and whose frequency is shifted into the other direction by the same shift frequency, while at least one of the frequency-shifted components is applied to a frequency discriminator whose output signal is applied through an integrating circuit to the modulator for controlling the slope of the modulation signal in order to keep the frequency of the frequency-shifted component constant.

In an advantageous embodiment of the invention, the transponder comprises a single antenna which is connected alternatingly to the input and the output of a delay circuit by means of a two-position switch. The delay is such that during each switch-over period, the antenna functions, for one position of the switch, as receiving antenna and in the other position as a transmitting antenna for retransmitting the delayed signal.

In such a transponder having a single antenna which serves as a receiving and transmitting antenna, the antenna switch-over circuit can be energized with a frequency equal to the shift frequency for forming the component of the received frequency-shifted signal while in the interrogator the components of the frequency-shifted beat signals are formed by demodulating the beat signals with a local oscillator whose frequency is controlled on said switch-over frequency.

It may be advantageous to specify a transponder not only by a frequency shift but also by another characteristic of the re-transmitted wave.

In accordance with the invention, a transponder of this type comprises an amplitude modulator for modulating the amplitude of the signal to be re-transmitted with a given modulation frequency which characterizes that transponder in such a system, the interrogator comprises, connected in parallel with the input of the frequency discriminator, an amplitude modulator detector followed by a detector for the frequency of the amplitude modulation.

A transponder of this type may furthermore be utilized for transmitting digital data to the interrogator. To this end, it is provided with a frequency-shift modulator for modulating the amplitude-modulation frequency as a function of the digital data.

The following description of the accompanying drawings given by way of example, will further explain how the invention can be realized.

Figure 1:
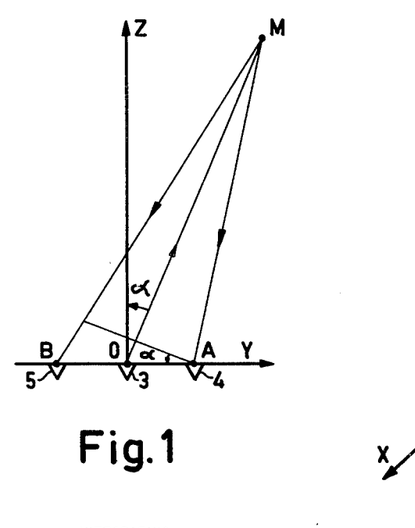
FIGS. 1 and 2 are diagrams showing angular measurements to be effected for locating an object in a plane and in space, respectively.
Figure 2:
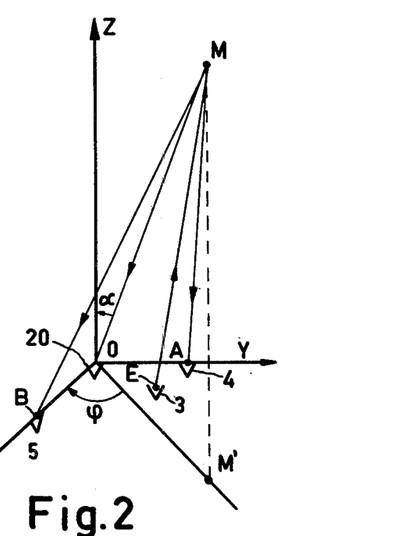

It is an object of the system according to the invention to locate a given object in a system of references. In FIG. 1 the object, represented by the point M, is assumed to remain in a plane and the reference system is formed by the rectangular axes OY, OZ. The position of M can be determined by the angle $\alpha$ between the bearing OM and the axis OZ and by the range $\overline{OM}$. In FIG. 2 the point M is located in three dimensional space and the reference system is formed by the rectangular axes OX, OY, OZ. The position of the point M can be determined by the angle $\alpha$ as defined above, by the angle $\phi$ between the projection OM' of OM on the x-y plane and the axis OX and by the range $\overline{OM}$.

It is, in particular, an object of the system according to the invention to supply data about the angles characterizing the bearing OM, for example, the angle $\alpha$ in the case of FIG. 1 and the angles $\alpha$ and $\phi$ in the case of FIG. 2. But as will be seen it also furnishes, substantially without additional costs, the range data $\overline{OM}$.

Figure 3:
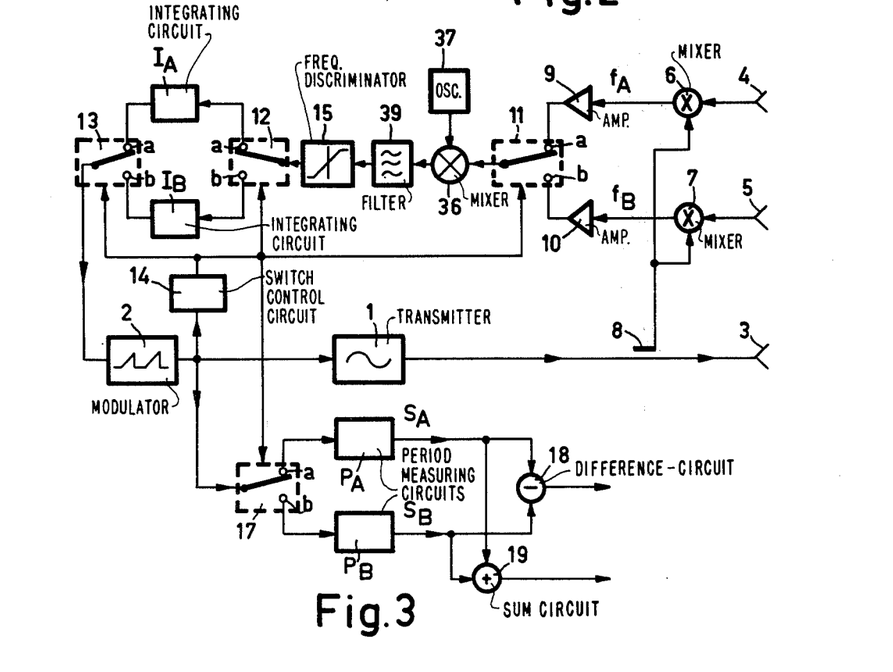
FIG. 3 shows a diagram of the interrogator portion of the system according to the invention used for locating an object in a plane.

FIG. 3 represents the diagram of the interrogator portion of the system according to the invention which is related to the reference system. This diagram applies to the case of FIG. 1 where the object remains in a plane.

As shown in FIG. 3, the interrogator comprises a transmitter 1 related to the reference system O Y Z and controlled by a modulator 2 which produces a sawtooth signal for supplying a linearly frequency-modulated signal to a transmitting antenna 3. The antenna 3 is, for example, disposed, as shown in FIG. 1, at the point 0 and radiates towards the object M. The latter is provided with a transponder which will be described hereinafter and which re-transmits a wave corresponding to the transmitted wave (that is to say linearly frequency-modulated, with the same modulation slope) but having a frequency which is shifted in a given direction with a given shift frequency which characterizes the transponder. The signal originating from the transponder is received by two receiving antennas 4 and 5, which are disposed in accordance with FIG. 1 on the reference axis OY at two points A and B which are symmetrical relative to point 0. The arrangement of the two receiving antennas 4 and 5 is hereinafter referred to as the measuring base of the system.

In accordance with the diagram of FIG. 3, mixer circuits 6 and 7 form the beat signals between a fraction of the signal from transmitter 1 supplied by coupler 8 and the signals received by the antennas 4 and 5. The beat signals having the frequency $f_A$ and $f_B$ are amplified in the amplifiers 9 and 10. In the embodiment of FIG. 3, switch-over means shown in the form of two-position switches 11, 12, 13, is provided in the path of the beat signals $f_A$ and $f_B$. These switches are energized by the control circuit 14 which moves, during two successive periods of the sawtooth signal of modulator 2, the switches alternately to the position a and to the position b. Switch 11 alternately directs the beat signals $f_A$ and $f_B$ to the frequency discriminator 15. Connected between the switch-over circuit 11 and the frequency discriminator 15 are: a mixer circuit 36 which shifts the frequency of the beat signals $f_A$ and $f_B$ distributed in the time by the switch-over circuit 11, by a fixed frequency supplied by the osicllator 37; and a bandpass filter 39 centered around the center frequency $f_O$ of the frequency discriminator 15. The frequency of oscillator 37 is equal to the shift frequency which characterizes the transponder and the shift of the beat frequencies $f_A$ and $f_B$ is performed in the sense opposite to that effected in the transponder. The output signal of the frequency discriminator 15 is alternately directed to the integrating circuits $I_A$ and $I_B$ by the switch 12. Finally, the output signals of the integrating circuits $I_A$ and $I_B$ are alternately directed by the switch 13 to the modulator 2 for controlling the slope of the sawtooth-modulated signal.

The output signal of modulator 2 is applied to the common terminal of the switch 17 which, as for the abovementioned switch, alternately moved to positions a and b by the control signal of circuit 14. During each period of the modulation signal when the switch 17 is in the position a (or b respectively), the circuit measuring the period $P_A$ (or $P_B$ respectively) supplies a measurement of the period $T_A$ (or $T_B$ respectively) of the slope of the modulation signal (duration of a sawtooth). It is, for example, assumed that the circuits $P_A$, $P_B$ convert the measured periods $T_A$ and $T_B$ into continuous signals $S_A$ and $S_B$. The circuit 18 forms the difference between the continuous signals $S_A$ and $S_B$ and this difference signal corresponds to the desired data for, as will be shown hereinafter, it is a well-determined function of the angle $\alpha$ of FIG. 1. In addition, the circuit 19 forms the sum of the signals $S_A$ and $S_B$ and this sum signal is representative of the range $\overline{OM}$.

The location system, which will be described below, is based, as regards the determination of the angle $\alpha$ shown in FIG. 1, on the fact that since the range $\overline{OM}$ is large relative to the distance 2a which separates the two antennas 4 and 5, the difference $\Delta R$ between the ranges $\overline{MA}$ and $\overline{MB}$ is related, with an excellent approximation, to the angle $\alpha$ by the expression:

$$\Delta R = 2a \sin \alpha \qquad (1)$$

It is clear from FIG. 1 that $\Delta R$ can be obtained from the difference between the paths traversed by the wave from transmitting antenna 3 to receiving antennas 4 and 5 through the object M to be located. In the system according to the invention each of these paths is measured by a method of the type utilized in linearly frequency-modulated controlled-slope radioaltimeters. The principle of such a radioaltimeter is, for example, disclosed in French patent specification No. 7607058 filed in the name of Applicants on 12th March 1976 (see FIGS. 1 and 2). Here it is only indicated that in this radioaltimeter a boat signal is formed between, on the one hand, a linearly frequency-modulated signal having a fixed frequency deviation $\Delta F$ and applied to a transmitting antenna radiating towards the ground and, on the other hand, the signal reflected from the ground and received by a receiving antenna. This beat frequency $f_b$ is related to $\Delta F$, to the period T of the modulation slope and to the transit time $\tau$ of the wave between the transmitting antenna and receiving antenna via the ground by the expression:

$$f_b = \Delta f(\tau/T)$$

This beat signal is utilized in a control loop for modifying the slope of the modulation in order to keep the beat frequency equal to a hold frequency $f_o$ supplied by a frequency discriminator included in the control loop. When the loop is stabilized the period T of the slope of the modulation is proportional to the transit time $\tau$, in accordance with the expression:

$$T = \frac{\Delta F}{f_o} \tau \qquad (2)$$

In the interrogator of FIG. 3 a control loop of this type is used which is alternately controlled by the signals derived from the beat signals $f_A$ and $f_B$ by a frequency shift effected by means of the mixer circuit 36, the oscillator 37 and the bandpass filter 39. From the following discussion it is clear that the frequency shift effected in the interrogator cancels the effect of the frequency shift effected in the transponder so that the control loop of the slope of the modulation signal acts as if there had been no frequency shift. But it is also clear that equal frequency shifts in the opposite direction, effected in a transponder and in the interrogator allow selection of a specific transponder and result in rejection of parasitic echos originating, for example, from the ground.

Figure 4:
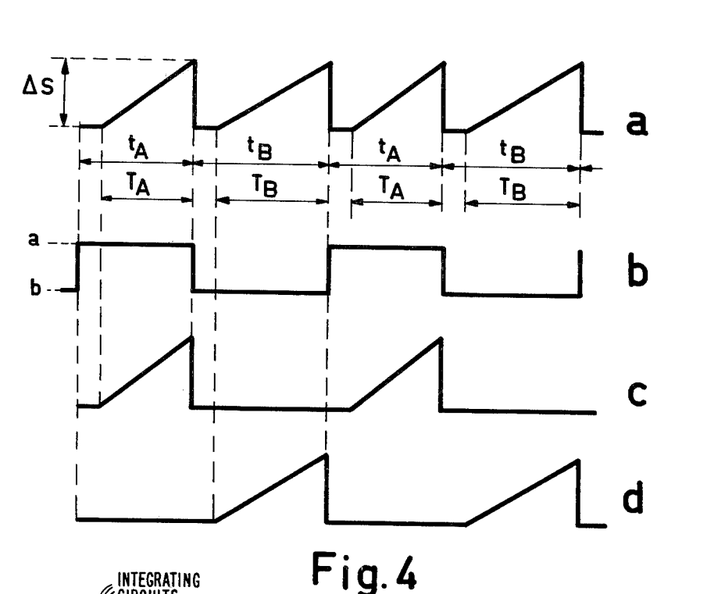
FIG. 4 represents diagrams of various signals present in the diagram of FIG. 3.

To explain the operation of the interrogator of FIG. 3 the diagram 4a of FIG. 4 shows the sawtooth modulation signal supplied by the modulator 2. This signal has a constant amplitude $\Delta S$ corresponding to the deviation of the constant frequency $\Delta F$ of the transmitter 1. The time interval between two straight consecutive edges is called the period of this signal. During each period the modulation signal has a constant value during a constant period and thereafter a value which increases linearly during a variable period of time, called duration of the modulation slope, and which will be further explained below.

The diagram 4b shows the control signal of the switching circuits 11, 12, 13, 17 which changes the value at each straight edge of the modulation signal 4a and which moves these switches alternately during the periods $t_A$ and $t_B$ between positions a and b.

During the periods $t_A$ in which the switches are in position a, the beat signal $f_A$ is formed starting from the signal from antenna 4 and shifted in frequency, which is utilized in the control loop comprising the frequency discriminator 15 and the integrating circuit $I_A$ for controlling the slope of the modulation signal of the modulator 2. During the periods $t_B$ in which switches are in the position b, the beat signal $f_B$ is formed starting from the signal from antenna 5 and shifted in frequency, which is utilized for controlling the slope of the modulation signal of the modulator 2, the control loop comprising the same frequency discriminator 15 but a different integrating circuit $I_B$. During the periods $t_A$ or $t_B$ in which the switches are in the position a or b, the slope of the modulation signal is controlled in such a way that the signal frequency $f_A$ or $f_B$ is equal to the central frequency $f_o$ of the discriminator 15. By applying the above-mentioned formula (2) it can be shown that the modulation periods $T_A$ and $T_B$ during the periods $t_A$ and $t_B$ are related respectively to the transit time $\tau_A$ of the wave between the antenna 3 and the antenna 4 via the object M and to the transit time $\tau_B$ of the wave between antenna 3 and antenna 5 through the object M, by the expressions:

$$\begin{cases} T_A = \frac{\Delta F}{f_o} \tau_A \\ T_B = \frac{\Delta F}{f_o} \tau_B \end{cases} \qquad (3)$$

By expressing the transit times $\tau_A$ and $\tau_B$ as a function of the corresponding paths in FIG. 1 and of the propagation speed C, equations (3) become:

$$\begin{cases} T_A = \frac{\Delta f}{f_o C} (\overline{OM} + \overline{MA}) \\ T_B = \frac{\Delta f}{f_o C} (\overline{OM} + \overline{MB}) \end{cases} \qquad (4)$$

During periods $t_A$ and $t_B$ when the modulation periods are $T_A$ and $T_B$, the switch 17 alternately directs the modulation signal towards the period measuring circuits $P_A$ and $P_B$ so that they receive signals of the form indicated in the diagrams 4c and 4d. The circuits $P_A$ and $P_B$ supply continuous signals $S_A$ and $S_B$ which are proportional to the modulation periods $T_A$ and $T_B$ and the difference signal 18 supplies a signal $S_A - S_B$ proportional to $T_A - T_B$.

By assuming $\Delta R = \overline{MA} - \overline{MB}$ from relations (4) it follows that:

$$T_A - T_B = \frac{\Delta F}{f_o C} \Delta R$$

Taking equation (1) into account it is possible to write:

$$T_A - T_B = \frac{2a \cdot \Delta F}{f_o C} \sin \alpha \qquad (5)$$

It is thus shown that at the output signal of the difference circuit 18 is proportional to $\sin \alpha$, corresponding to the angle $\alpha$ which characterizes the bearing of the object M.

Moreover, since the range $\overline{OM}$ is large compared to the distance $2a$ between the two receiving antennas 4 and 5 located at A and B: $\overline{OM} = \overline{MA} + \overline{MB}/2$ and using equations (4) the following relationship is derived:

$$T_A + T_B = \frac{4 \Delta F}{f_o C} \cdot \overline{OM} \qquad (6)$$

It is thus shown that at the output signal of the adding circuit 19 is proportional to the distance OM from point O to the object M.

It should be noted that in practice, it is possible to avoid the use of an adder 19 for obtaining the range of the object at the base A B. In effect, since the length of this base is small as compared to the distance $\overline{OM}$, $\overline{MA} \simeq \overline{OM}$. It is clear that in accordance with the equation (4), the measurement of one or the other of the periods $T_A$ or $T_B$ by the circuits $P_A$ or $P_B$ in practice supplies the distance $\overline{OM}$.

A variant of the system of FIG. 3, instead of the two mixer circuits 6 and 7, uses only a single mixer circuit which, on the one hand, alternately receives the signals from the receiving antennas 4 and 5 by means of a suitable switch-over circuit energized by the control signal of the circuit 14 and, on the other hand, the signal from the transmitter 1. Consequently, the frequency discriminator 15 receives, as above, the beat signals $f_A$ and $f_B$, shifted in frequency and distributed in the periods $t_A$ and $t_B$.

Another variant of the same type utilizes, instead of the two period measuring circuits $P_A$ and $P_B$, only the period measuring circuit to which the modulation signal is applied. This measuring circuit would supply the discrete signals $S_A$ and $S_B$, distributed in the time and proportional to the periods $T_A$ and $T_B$; by means of a switch these signals would be distributed over two channels connected to a difference circuit by means of suitable delay circuits, the difference circuit furnishing, as above, the required angular information.

All the switching circuits which are shown in the form of contacts might also be implemented by means of semiconductor components such as diodes.

The system according to the invention can easily be extended to the three dimensional case shown in FIG. 2 wherein the bearing of the object m is determined by the angles $\alpha$ and $\phi$ defined above. It is possible to form a measuring base related to the reference system, by means of three receiving antennas arranged, for example, in the following manner: two antennas 4 and 5 are positioned on the axes OY and OX at the distance a from the point O and the third antenna 20 is located at point O. The transmitting antenna 3 is located at the plane XOY in a point E which is relatively close to the receiving antennas. Since the distance of the object M to the measuring base is large with respect to the distance a, it can be shown that the differences $\Delta R_1 = \overline{AM} - \overline{OM}$ and $\Delta R_2 = \overline{BM} - \overline{OM}$ are functions of a and the angles $\alpha$ and $\phi$. The system according to the invention is based in this case on measuring the differences $\Delta R_1$ and $\Delta R_2$ from which the angles $\alpha$ and $\phi$ can be determined.

Figure 5:
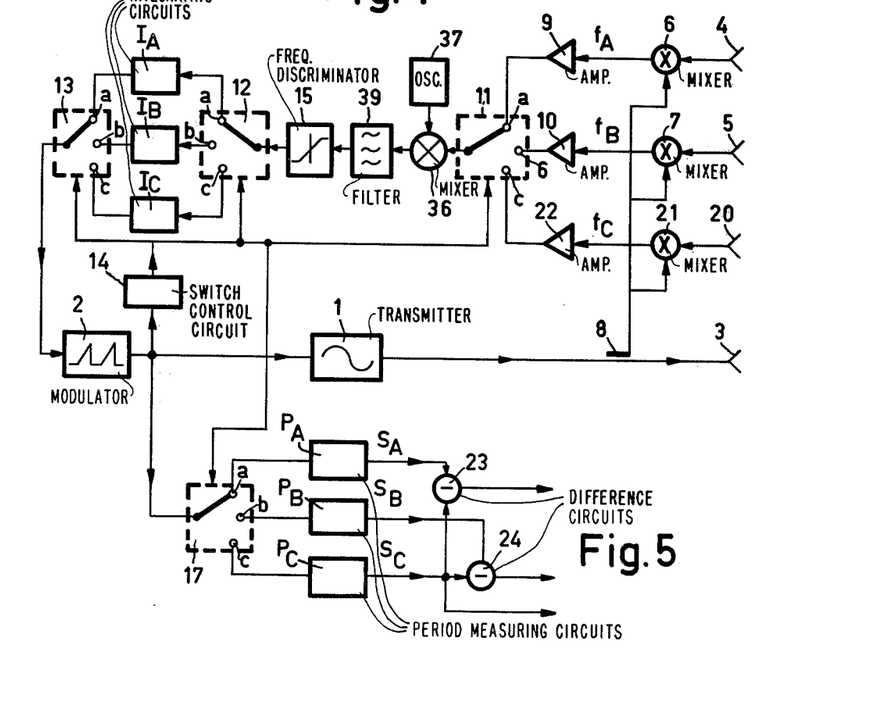
FIG. 5 shows a diagram of the interrogator portion of the system according to the invention used for locating an object in space.

FIG. 5 shows the interrogator portion of the system according to the invention for measuring $\Delta R_1$ and $\Delta R_2$. It comprises, in addition to the devices which process the signals of the receiving antennas 4 and 5 indicated by the same reference numerals as in FIG. 3, a mixer circuit 21 which furnishes a beat signal of frequency $f_C$ between the signal of the receiving antenna 20 and the signal of the transmitter 1 signal $f_C$ is then amplified in the amplifier 22. In addition, the interrogator includes an integrating circuit $I_C$, which has the same function as the integrating circuits $I_A$ and $I_B$. The switch-over circuits 11, 12, 13, 17 are now three-position switches which are successively adjusted, under the control of circuit 14, to the positions a, b, c for the successive periods $t_A$, $t_B$, $t_C$ of the modulation signal of the modulator 2. A switch 17 having three positions a, b, c, successively directs the modulation signal towards the period measuring apparatus $P_A$, $P_B$, $P_C$ during the periods $t_A$, $t_B$, $t_C$. Circuit 23 forms the difference between the output signal $S_A$ of the circuit $P_A$ and the output signal $S_C$ of the circuit $P_C$ and circuit 24 forms the difference between the output signal $S_B$ of the circuit $P_B$ and the signal $S_C$. The signals at the outputs of the difference circuits 23 and 24 are proportional to the quantities $\Delta R_1$ and $\Delta R_2$ defined above, while signal $S_C$ furnishes a range measurement $\overline{OM}$.

These results can be explained by the fact that during the periods $t_A$, $t_B$, $t_C$ the slope of the modulation signal is controlled in such a way that $f_A = f_o$, $f_B = f_o$ and $f_C = f_o$, respectively. In the present case it is possible to express the modulation periods $T_A$, $T_B$, $T_C$ during the periods $t_A$, $t_B$, $t_C$ in an identical manner as for the formulas (4):

$$\begin{cases} T_A = \frac{\Delta F}{f_o C}(\overline{EM} + \overline{MA}) \\ T_B = \frac{\Delta F}{f_o C}(\overline{EM} + \overline{MB}) \\ T_C = \frac{\Delta F}{f_o C}(\overline{EM} + \overline{MO}) \end{cases} \quad (7)$$

When forming the differences $T_A - T_C$ and $T_B - T_C$, the quantities proportional to $\Delta R_1$ and $\Delta R_2$ are obtained while the output signals of the difference circuits 23 and 24 constitute a measurement of $\Delta R_1$ and $\Delta R_2$ from which the angles $\alpha$ and $\phi$ can be deduced. Moreover, since $\overline{EM} \approx \overline{MO}$, $T_C$ constitutes a range measurement from the point O to the object M.

The operation of the location system and several variants of the interrogator will now be described with reference to an examplary application. The application chosen to illustrate the operation of the system relates to the problem of remaining in position in a formation of helicopters. This problem will be explained with reference to FIG. 6 which shows two helicopters, one of which, $H_1$, is the leader, the other one, $H_2$, the follower, which are part of a formation with other helicopters, not shown. To fly in formation, each helicopter $H_2$ must know, in its own reference system, the position (bearing and range) of the helicopter $H_1$ which is in front of it, the speed at which the two helicopters approach or move away from each other and its proper altitude relative to the ground. Finally the data about the course of the leading helicopter $H_1$ must be transmitted towards the follower helicopter $H_2$. The system according to the invention is particularly suited for solving this problem.

Each helicopter $H_2$ is provided at the front with an interrogator comprising a transmitting antenna 3 disposed on the axis OZ of the helicopter which transmits in the direction of the transponder 30 disposed at a point N on the tail of the helicopter $H_1$. The interrogator, furthermore, comprises two receiving antennas 4 and 5 disposed on the axis OY symmetrically relative to the axis OZ and at a distance of approximately 1.50 m from each other. It is clear that the system according to the invention as described on the basis of FIG. 3 is suitable for measuring in the hleicopter $H_1$ the angle $\alpha$, the bearing of the helicopter $H_1$ relative to the helicopter $H_2$ and the distance $\overline{ON} = 1$ between them. In addition, this system can be adapted in a very simple manner for also measuring the altitude of the helicopter $H_1$, the relative speed of the two helicopters and for transmitting the course of $H_1$ with respect to $H_2$. In this problem, however measures must be taken to ensure that the measurements effected by means of the interrogator of $H_2$ and the transponder of $H_1$ are not disturbed from signals reflected by the ground or coming from other helicopters in the formation.

Figure 7:
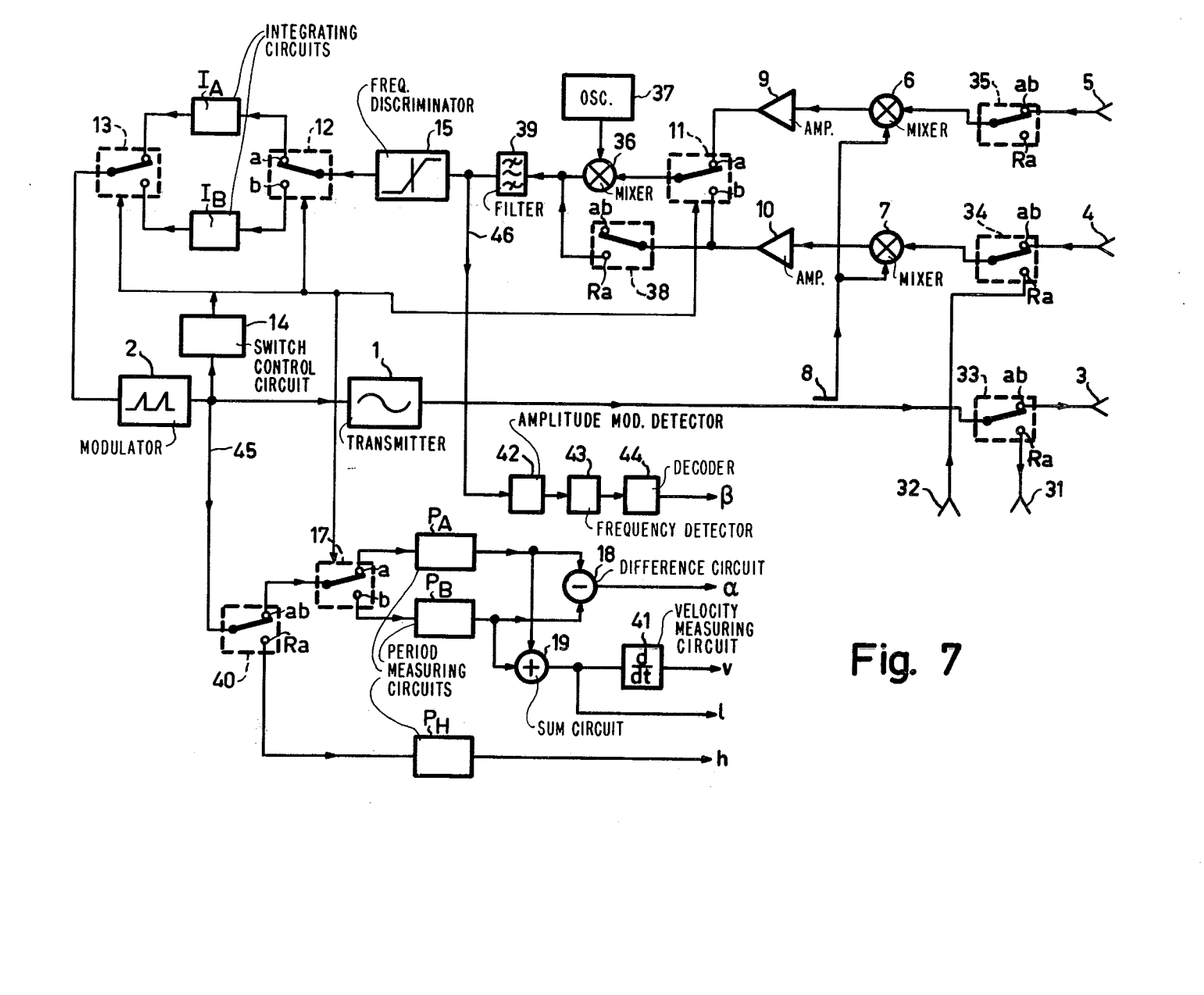
FIG. 7 represents the diagram of an interrogator particularly suitable for the problem shown in FIG. 6.

FIG. 7 is a diagram of an interrogator, comprising in addition to the components of the system shown in FIG. 3, which have the same reference numerals, components which are described in greater detail below.

Figure 6:
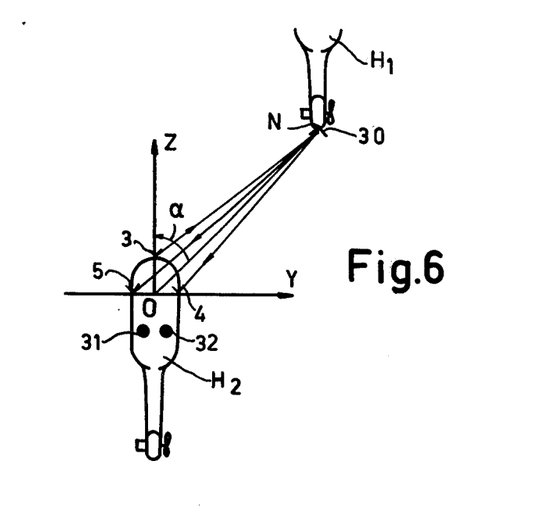
FIG. 6 shows diagrammatically two helicopters flying in formation and provided with the interrogator and the transponder of the system according to the invention.

The diagram of FIG. 7, and also of FIG. 6, show the transmitting antenna 31 and the receiving antenna 32, which are both directed towards the ground in order to measure the altitude of the helicopter. Arranged in the signal paths from antennas 3, 4 and 5 are switching circuits 33, 34, 35 which are controlled so that they are simultaneously moved into either position ab in which the mixer circuits 6 and 7 furnish the beat signals $f_A$ and $f_B$ relative to the receiving antennas 4 and 5, or into position Ra in which the mixer circuit 6 does not furnish the relevant beat signal and for which the mixer circuit 7 supplies a radioaltimeter beat signal $f_H$ between the signal transmitted by antenna 31 and the signal received by antenna 32.

In addition, the following components are successively included between the switching circuit 11 and the frequency discriminator 15: a mixer circuit 36 which shifts the beat frequencies $f_A$ and $f_B$ coming from the switching switch 11 with a fixed frequency $\delta_p'$ furnished by the oscillator 37; and a band-pass filter 39 centered around the center frequency $f_o$ of the discriminator 15. Finally, the output of the amplifier 10 is connected to the input of the filter 39 by means of the switching circuit 38 when it is in position Ra; the other position ab of this switch is not used.

A switching circuit 40 having two positions ab and Ra is connected to the branch wire 45 at the output of the modulator 2 and the switch 17. Depending on whether switch 40 is in position ab or Ra, it directs the modulation signal either towards the switch 17, which has the same function as in FIG. 3, or towards the period measuring circuit $P_H$ which furnishes an indication of the altitude of the helicopter.

A circuit 41 which furnishes a relative speed measurement of the two helicopters is connected to the output of the adder 19 which furnishes a range measurement.

Finally, connected between the filter 39 and the frequency discriminator 15 there is a branch wire 46 which is connected to an amplitude modulation detector 42, followed by a frequency detector 43 and a decoder 44. As will be explained hereinafter the latter furnishes the data on the course of the leading helicopter $H_1$.

Before explaining how the interrogator of FIG. 7 functions, it should be noted that it comprises switching circuits of two types as regards their control and their function. The switching circuits 11, 12, 13, 17, called a/b type circuits, were described with reference to FIG. 3, and are energized at each cycle of the modulation signal by the control signal shown in the diagram 4b of FIG. 4. The switching circuits 33, 34, 35, 38 and 40, called ab/Ra-type circuits are energized by means, not shown, to be adjusted, for example during approximately 100 mS of each second to the position Ra while for the rest of the time they are in position ab.

When the switching circuits ab/Ra are in position ab, the system operates on the basis of the signals from the receiving antennas 4 and 5, precisely as the system of FIG. 3, the difference circuit 18 furnishing the data about the position $\alpha$, the adder circuit 19 supplying the information between the range l of the two helicopters, and the shunting circuit 41 supplying the relative speed data of the two helicopters. The presence of the mixer circuit 36 in the control loop of the modulator is necessary for producing in the beat frequencies $f_A$ and $f_B$ derived from the signals received by the antennas 4 and 5 a frequency shift $\delta_p$ of the same magnitude and the opposite sense as the frequency shift $\delta_p$ produced in the signal received by the transponder 30 of the helicopter $H_1$. Each helicopter of the type $H_1$ has a transponder characterized by a specific value of the shift frequency $\delta_p$ so that a following helicopter, such as $H_2$, can identify the helicopter it must follow. The function of the filter 39 is to completely eliminate signals applied to the frequency discriminator 15 such as the parasitic beat signals which might be produced, for example, by waves reflected from the ground which reach the receiving antennas 4 and 5. Finally, circuit 42 detects an amplitude modulation which is effected in the transponder 30 of the helicopter $H_1$ on the signal it receives. The frequency $\omega$ of this amplitude modulation has a relatively low value (for example some KHz) which is specific for each helicopter and which, together with the above-mentioned frequency shift $\delta_p$ contributes to the identification of each helicopter by an interrogator. Simultaneously, frequency shifts $\pm\delta\omega$ of the amplitude modulation frequency are effected in the transponder of $H_1$ for transmitting binary signals which are used to transmit to the helicopter $H_2$, in coded form, the course of the helicopter $H_1$. The frequency detector 43 supplies binary signals corresponding to the frequency displacement $\pm\delta\omega$ of the amplitude modulation and the decoder 44 supplies, in analog form, the bearing $\beta$ of the helicopter $H_1$.

When the switches ab/Ra are in the position Ra, only the antennas 31 and 32 directed towards the ground are used and the mixer circuit 7 furnishes the radioaltimeter beat signal $f_H$, which as in a conventional radioaltimeter, is used to control the slope of the signal of the modulator 2. The duration of this slope is measured in the measuring circuit $P_H$ which thus supplies the height indication h of the helicopter $H_2$.

Figure 8:
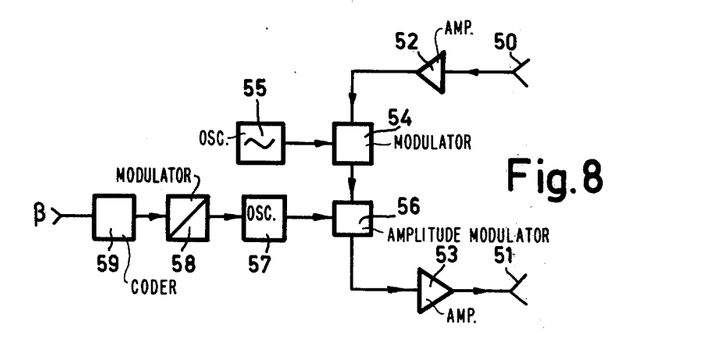
FIG. 8 represents the diagram of the transponder associated with the interrogator of FIG. 6.

FIG. 8 shows the diagram of a transponder such as the transponder installed on the helicopter $H_1$ and indicated at 30 in FIG. 6. The transponder comprises two antennas spaced a distance of 1 m from each other. The receiving antenna 50 and the transmitting antenna 51 are connected to amplifiers 52 and 53, respectively. To ensure the above-described functions, the output of amplifier 52 is connected to a modulator BLU 54 which receives, from an oscillator 55, the shift frequency $\delta_p$ whose value is characteristic of the helicopter. Thereafter, the output of modulator BLU 54 is connected to the input of an amplitude modulator 56 in which the amplitude of the input signal is modulated on the output frequency of the oscillator 57. The output frequency, whose nominal value is characteristic of the helicopter, is shifted over $\pm\delta\omega$ by the modulator 58 in accordance with the binary value the digital signals applied by the coder 59, which digital signal corresponds to the bearing information to be transmitted towards the interrogator.

In the system for maintaining a helicopter in formation described above there are three antennas for the interrogator and two antennas for the transponder. A variant which will now be described reduces the number of these antennas.

Figure 9:
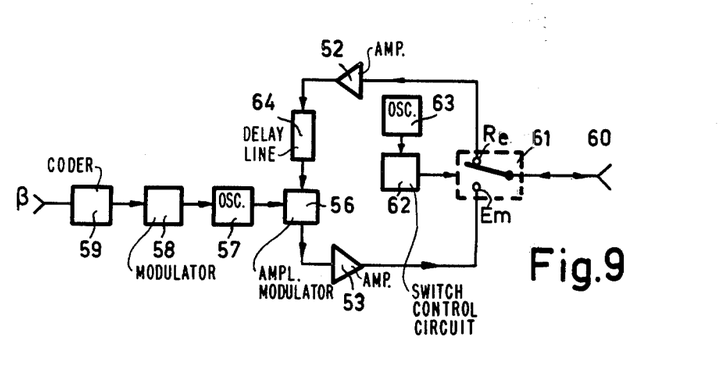
FIG. 9 represents the diagram of a variant of the transponder of FIG. 8, having a single antenna.

FIG. 9 shows a diagram of a transponder corresponding to this variant in which the components having the same function as those of the embodiment of FIG. 8 have been given the same reference numerals. The transponder of FIG. 9 comprises a single antenna 60 which alternately acts as transmitting and receiving antenna, as will be explained below. Antenna 60 is connected to the common point of a switch 61 which is in one or the other of its two positions, Em and Re, in accordance with the value of a control signal supplied by the control circuit 62. The switch control signal has a fixed frequency $\delta_p$ obtained from a quartz oscillator 63. When the switch 61 is in the position Re, the antenna 60 is connected to the amplifier 52 which, in turn is connected to the delay line 64. The signal from the delay line 64 is fed to a amplitude modulator 56 which is connected on the one hand, to the components 57, 58, 59 described with reference to FIG. 8 and, on the other hand, to the amplifier 53. The output of the latter is connected to antenna 60 when the switch 61 is in position Em.

Figures 10, 11:
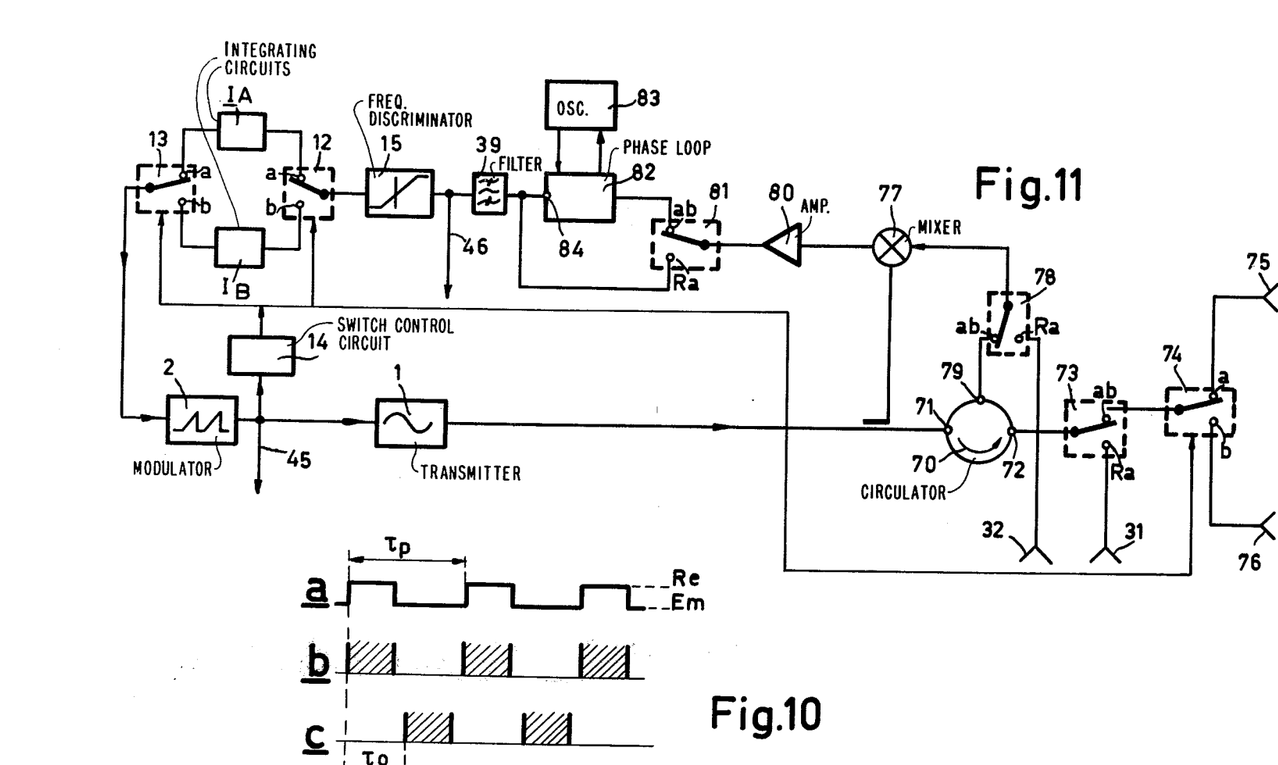
FIG. 10 shows diagrams of the signals in the transponder of FIG. 9.
FIG. 11 represents a variant of the interrogator of FIG. 7, comprising a limited number of antennas.

The diagrams of FIG. 10 illustrate the operation of this transponder. The diagram 10a shows the shape of the control signal supplied to switch 61. This signal which has frequency $\delta_p$ has two levels Em and Re corresponding to the positions Em and Re of the switch and is such that in each period $\tau_p = 1/\delta_p$ the duration of Em is at least equal to the duration of Re. Diagram 10b shows, by means of the hatched areas, the instants at which the signal received by antenna 60 is transferred to the input of the delay line 64. The diagram 10c shows, by means of hatched areas, the periods in which the received signal appears at the output of the delay line 64. The delay $\tau_o$ of the delay line is such that the delayed received signal is produced within the periods at which the switch 61 is in the position Em. It is therefore clear that the antenna 60 of the transponder retransmits the received signal delayed by $\tau_o$. This retransmission is effected periodically with a frequency equal to the control frequency $\delta_p$ of the switch 61 ($\delta_p$ is, for example, equal to 1 MHz). As a result the image of the received signal is composed of beams shifted over a whole multiple of the frequency $\delta_p$ with reference to the instantaneously re-transmitted frequency. This is equivalent to a frequency shift $\delta_p$ effected in the transponder of FIG. 8 by means of the modulator BLU 54. In addition, as regards the re-transmission of the bearing data $\beta$ this re-transmission is effected, as explained with reference to FIG. 8, by means of the amplitude modulator 56.

FIG. 11 shows part of the diagram of an interrogator performing the same functions as that of FIG. 7 but which utilizes only two instead of three antennas which may be used with a transponder of the type shown in FIG. 9.

The interrogator of FIG. 11 includes a number of components which are identical to those of the interrogator shown in FIG. 7 and have the same reference numerals. For simplicity only the circuits which are disposed in the control loop of the modulator 2 are shown.

The interrogator of FIG. 11 comprises a circulator 70 having a terminal 71 which is supplied with the linearly frequency-modulated signal to be transmitted by generator 1. Terminal 72 of the circulator is connected, by a type ab/Ra switch 73 either to the common point of a type a/b switch 74 or to the transmitting antenna 31 which is directed towards the ground. The common point of switch 74 is directed alternately as a function of the control signal shown in diagram 4a (FIG. 4) towards the two antennas 75 and 76 which form the measuring base for the measurements associated with the transponder. The circuit mixer 77 has an input which is connected to the coupler 8 for receiving a portion of the transmitted signal and a second input which is connected through a type ab/Ra switch 78 either to the terminal 79 of the circulator 70 or to the receiving antenna 32 which is directed towards the ground. The output signal of mixer 77 is amplified by amplifier 80, and directed through a type ab/Ra switch 81 either to the input of a phase loop circuit 82 or to the input of the filter 39. The phase loop 82 is energized for controlling the frequency of the variable oscillator 83 and for supplying at each output 84 the same beat signal as that supplied by mixer 36 to the interrogator of FIG. 7. It will be seen that the circuit formed by the phase loop 82 and the oscillator 83 is the only portion of the diagram which renders the interrogator suitable for use with the transponder of the type shown in FIG. 9. The control loop is connected in the same manner between the filter 39 and the modulator 2. Not shown are the circuits connected to the shunt wire 45 at the output of the modulator 2 and the circuits connected to the shunt wire 46 at the output of the filter 39. All these circuits are identical to those of FIG. 7.

The interrogator of FIG. 11 operates as follows: when the switches 73, 78, 81 are in the position ab (for example during a period of 900 mS of each second), the two antennas 75 and 76 alternately transmit the signal supplied by generator 1 through the terminals 71, 72 of the circulator 70. During the instants that each antenna transmits, it receives the signal originating from the transponder of FIG. 9 which as shown above, is cut off at the fixed frequency $\delta_p$ (see diagram 10c FIG. 10). This cut-off signal is applied via terminals 72, 79 of the circulator 70 to the mixer 77. The image of the signal at the output of the mixer 77 is centered around the beams $n\delta_p \pm f_A$ or $n\delta_p \pm f_B$ depending on whether the switch 74 is in position a or in position b; the frequencies $n\delta_p$ (with $n = 0, 1, 2 \ldots$) represent the harmonics of the cut-off frequency $\delta_p$; $f_A$ and $f_B$ are the beat frequencies which would have been received without the cutting-off action and which are utilized in the control loop. The signal supplied by the mixer 77 which has these characteristics is applied to the phase loop 82 in which it is demodulated in a known manner by two quadrature signals of the frequency $\delta'_p$ from the oscillator 83, $\delta'_p$ being near the fixed cut-off frequency $\delta_p$. By forming the digital product of the two demodulated signals a phase-difference signal is obtained which is associated with the frequency difference $\delta_p - \delta'_p$ and this difference signal is then used for controlling the frequency $\delta'_p$ of the oscillator 83 in such a way that $\delta'_p = \delta_p$ is obtained. One of the demodulators (not shown) included in the phase loop 82 supplies a signal of the frequency $f_A$ or $f_B$ which is used in the same manner as in the diagram of FIG. 7 for controlling the slope of the modulation signal of the modulator 2.

When the switches 73, 78, 81 are in the position Ra (for example during 100 mS of each second) the antennas 75, 76 are not used. The signal from the transmitter 1 is applied to the antenna 31 which is directed towards the ground and the mixer 77 supplies a beat signal $f_H$ between a fraction of the emitted signal and the signal received on the antenna 32 directed towards the ground. The beat signal $f_H$, which corresponds to the altitude, is utilized in the same manner as in a conventional radioaltimeter for controlling the slope of the modulation signal of modulator 2.

The interrogator of FIG. 11 provided on the shunt wires 45 and 46 of the same measuring circuits as those of FIG. 7 supplies the same data.

The location system according to the invention might be used for other applications, particularly in aeronautics. For example, the system may be employed for "homing" by using a stationary ground-based transponder to direct an aircraft provided with an interrogator towards the transponder on the basis of the angular measurement supplied by the interrogator.

If two transponders are used on the ground and are successively interrogated by an interrogator on board of an aircraft, the interrogator supplies angular measurements by means of which the aircraft can be directed towards the two transponders while staying in the intermediary plane of the straight line which joins the two transponders. Thus the system operates as a "localiser".

If three transponders are arranged in a triangle on the ground and are successively interrogated by an interrogator on board an aircraft the interrogator supplies angular measurements by means of which the aircraft can be directed along an axis formed by the intersecting line of the intermediate planes of the sides of the triangle.

What is claimed is

1. A radio locating system comprising an interrogator having means for transmitting a radio signal to a transponder, said transmitting means including means for modulating said radio signal with a modulation signal having a linearly varying frequency, said transponder including means for receiving said radio signal, means for forming from the received signal, a signal having a component with the same modulation slope as that of the received signal and a frequency shifted in one direction by a predetermined amount characteristic of that transponder, and means for transmitting the signal having said frequency shifted component to said interrogator, said interrogator further including at least two spaced antennas for receiving said signal with said frequency shifted component, means, coupled to said antennas, for deriving a beat signal from the signal received by each antenna and the signal transmitted by said interrogator transmitting means, means for shifting the frequency of at least one of said beat signals by said predetermined amount in a direction opposite to said one direction, a frequency discriminator having an output and an input coupled to said frequency shifting means, means for coupling the signal at said output of said discriminator to said modulating means to control the slope of said modulation signal so that the frequency of said frequency-shifted component is constant, and means for deriving from said beat signals data regarding the bearing of said transponder relative to said interrogator.

2. The system according to claim 1 including means for deriving from said beat signals data regarding the range of said transponder.

3. The system according to claim 1 wherein said transponder includes an antenna, a delay line having an input and an output, and two-position switching means for alternately connecting said antenna to said input and output of said delay line, the delay of said delay line being such that during each cycle of said switching means said antenna acts as a receiving antenna for one position of said switching means and as a transmitting antenna for transmitting the delayed signal for the other position of said switching means.

4. The system according to claim 3, wherein the switching frequency of said switching means is equal to said shift frequency and said interrogator comprises means, including an oscillator generating a signal with a frequency equal to said switching frequency, for demodulating said at least one beat signal.

5. A location system according to claim 1 wherein said transponder includes means for modulating the amplitude of the signal to be re-transmitted with a given frequency characteristic of that transponder and said interrogator includes an amplitude modulation detector and means connected to the input of said frequency discriminator for detecting the frequency of the amplitude modulation.

6. The system according to claim 5, wherein said transponder includes means for shifting said amplitude modulation frequency as a function of digital data to be transmitted to said interrogator.

7. The system according to claim 1, wherein said first-named transmitting means includes a transmitter controlled by said modulating means, said transmitter having an output for supplying said linearly frequency modulated radio signal, and said coupling means includes an integrating circuit.

8. The system according to claim 7, wherein said interrogator includes first switching means for successively applying, during each cycle of said modulation signal, each beat signal to said discriminator and said coupling means includes a pair of said integrating circuits and second switching means for alternately applying, during each cycle of said modulating signal, the signal at the output of said discriminator to one of said integrating circuits, said interrogator further including third switching means for alternately connecting said modulation means to said integrating circuits.

9. The system according to claim 8, wherein each of said switching means is a switching circuit having a plurality of positions each corresponding to one of said antennas and including means, responsive to said modulation signal, for simultaneously activating each of said switching circuits.

10. The system according to claim 9, wherein said beat signal deriving means includes a plurality of mixers each having a first input connected to one of said antennas, a second input coupled to said output of said transmitter and an output, said outputs of said mixers being alternately connected to said frequency shifting means by said first switching circuit.

11. The system according to claim 10, including further switching means for connecting, during a predetermined time interval of successive time periods of given duration, each of said mixer inputs to the associated antenna.

12. The system according to claim 9 including a circulator having a first, second and third terminal, means for connecting said first terminal to said output of said transmitter, means for connecting said second terminal to one of said antennas which also acts as a transmitting antenna for transmitting said radio signal, and means for connecting said third terminal to said beat signal deriving means.

13. The system according to claim 7 wherein said interrogator is disposed aboard an aircraft, said aircraft including a further antenna for reception of signals used for measuring the altitude of said aircraft, said interrogator including means for alternately connecting said further antenna and one of said at least two antennas to said beat signal deriving means.

* * * * *